(12) United States Patent
Sivan et al.

(10) Patent No.: US 11,276,052 B2
(45) Date of Patent: *Mar. 15, 2022

(54) POINT OF SALE SYSTEM WITH CUSTOMER-FACING DEVICE AND PRODUCT-SENSING DEVICES

(71) Applicant: Target Brands, Inc., Minneapolis, MN (US)

(72) Inventors: Jayachandran Sivan, Minneapolis, MN (US); Mindy Meyer, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/693,137

(22) Filed: Nov. 22, 2019

(65) Prior Publication Data

US 2021/0073771 A1  Mar. 11, 2021

Related U.S. Application Data

(60) Provisional application No. 62/896,455, filed on Sep. 5, 2019.

(51) Int. Cl.
*G06Q 20/20* (2012.01)
*G06Q 20/38* (2012.01)

(52) U.S. Cl.
CPC ......... *G06Q 20/206* (2013.01); *G06Q 20/382* (2013.01)

(58) Field of Classification Search
CPC .................. G06Q 20/206; G06Q 20/382
USPC ............................................. 705/18
See application file for complete search history.

(56) References Cited

U.S. PATENT DOCUMENTS

| 10,102,513 | B2 | 10/2018 | Dar | |
|---|---|---|---|---|
| 2005/0012613 | A1* | 1/2005 | Eckstein | G06K 7/0008 340/539.13 |
| 2006/0180662 | A1* | 8/2006 | Pirruccio | A47F 9/048 235/383 |
| 2009/0259516 | A1* | 10/2009 | Zeevi | G06Q 30/02 705/14.65 |
| 2011/0153393 | A1 | 6/2011 | Raff et al. | |
| 2011/0266092 | A1* | 11/2011 | Marquis | A47F 9/045 186/61 |
| 2014/0019256 | A1 | 1/2014 | Argue et al. | |
| 2014/0129362 | A1* | 5/2014 | Marquis | G07G 1/0036 705/23 |
| 2016/0283925 | A1* | 9/2016 | Lavu | G06Q 20/401 |
| 2016/0358147 | A1* | 12/2016 | Edwards | G06K 7/01 |
| 2017/0076269 | A1* | 3/2017 | Saeed | G07G 1/0018 |
| 2017/0076560 | A1* | 3/2017 | Dasilva | G06Q 30/06 |
| 2017/0124587 | A1 | 5/2017 | White | |
| 2017/0249491 | A1* | 8/2017 | MacIntosh | G06K 9/00671 |
| 2017/0364888 | A1 | 12/2017 | Bell et al. | |
| 2018/0174102 | A1* | 6/2018 | Winkle | G06Q 10/08355 |
| 2019/0303938 | A1* | 10/2019 | Sanchez-Llorens | G06Q 20/204 |

\* cited by examiner

*Primary Examiner* — Luna Champagne
(74) *Attorney, Agent, or Firm* — Fish & Richardson P.C.

(57) ABSTRACT

In one implementation, a checkout lane includes a point-of-sale terminal configured to complete a transaction, a payment terminal configured to receive payment information and securely transmit payment information, and a customer-facing device configured to add a product to the transaction.

18 Claims, 10 Drawing Sheets

POINT OF SALE SYSTEM WITH CUSTOMER-FACING DEVICE AND PRODUCT-SENSING DEVICES

CROSS-REFERENCE TO RELATED APPLICATIONS

This application claims the benefit of U.S. Provisional Application Ser. No. 62/896,455, filed Sep. 5, 2019. The disclosure of the prior application is considered part of (and is incorporated by reference in) the disclosure of this application.

TECHNICAL FIELD

This document generally relates to point of sale systems, which can include point of sale terminals, product conveyor belts, customer-facing devices, and/or other features.

BACKGROUND

Checkout aisles can include a point-of-sale terminal, a product scanner to identify products (e.g., barcode scanner, QR code scanner), payment terminal for accepting payment (e.g., credit card reader), and, in some instances, a conveyor system to hold and transport products as part of the checkout process (e.g., conveyor belt holding and conveying products that are yet to be scanned during a checkout process). The point-of-sale terminal can compile transaction information and communicate with the payment terminal to complete a transaction. Checkout aisles can include self-check-out, employee run aisles, express lanes, etc. The point-of-sale terminal can be linked to other point-of-sale terminals throughout the store.

Virtual shopping carts are digital data elements used in electronic shopping environments to temporarily store a collection of user-selected items from the electronic shopping environment for purchase. Virtual shopping carts are analogous to physical shopping carts in physical shopping environments (e.g., retail stores, grocery stores, home improvement stores, etc.), but they are used in digital/electronic shopping environments, such as online shopping websites and mobile apps. Like using a physical shopping cart, which include a physical receptacle to temporarily store and collect items selected by the user as they shop, virtual shopping carts collect digital shopping items that have been selected by the user during the shopping experience. Items within a virtual shopping cart can be viewed, added to, modified, and deleted, and the contents of the virtual shopping can be selected for purchase together. Digital shopping items added to a virtual shopping cart can represent physical shopping items, which can be shipped or otherwise delivered to the user.

SUMMARY

This document generally relates to systems and methods for providing a customer-facing device that can be used to present additional information to customers in a checkout aisle during the checkout process. The additional information can include, for example, suggestions on additional products to add to the customer's purchase during the checkout process, along with selectable options for the customer to add the suggested products to the customer's cart, to designate quantities for the products, to select fulfillment options for the products (e.g., in-store fulfillment, pick-up, delivery), and/or other options. Therefore, the customer-facing device can allow a customer to modify a transaction during checkout by adding virtual products (not physically present during the checkout process) to a shopping cart of physical products. The customer-facing device can be connected to a product suggestion system that determines products to suggest on the customer-facing device based on any of a variety of available information during the checkout process, such as information on scanned products, information on products that have been yet to be scanned (e.g., products on conveyor belt, products in physical shopping cart), information on the individual customer's historical shopping behavior (e.g., customer loyalty account information), information on the recent purchasing behavior of other customers in the individual store, and/or combinations thereof.

For instance, in an example scenario in which a customer has multiple boxes of cereal in his/her physical shopping cart but does not have any milk (example item that may, in some instances, typically be purchased with cereal), the system may detect that cereal is present in the cart but not milk. For example, the system can analyze product scans during the checkout process and can also use various product sensing devices (e.g., cameras, RFID sensors) that are trained on or around the product conveyor system and the shopping cart area to identify products that are going to be purchased but have yet to be scanned. Based on this analysis, the system can determine that several boxes of cereal are being purchased, but that milk is not present in the order. Based on this information, the system can determine and provide a suggestion to purchase milk to the customer on the customer-facing device. The customer can then select the quantity of milk to purchase and from available fulfillment options for the product (e.g., in-store, pick-up, delivery), and the selected options can be added to the products being purchased. The customer-facing device can help customers by providing convenient and unobtrusive suggestions for products that may have been forgotten/missed during a shopping experience, and can provide customers with convenient options to still purchase those items without having to run around the store to retrieve them.

The customer-facing device can aim to present helpful and relevant suggestions to the customer. For example, through the use of product sensing devices to identify products that are part of the customer's order but have not yet been scanned (e.g., items on the conveyor belt or in the customer's shopping cart), product suggestions on the customer-facing device can avoid providing duplicative product suggestions for products that are already included in the shopping cart (but which have not yet been scanned). By using product sensing devices, the full scope of the contents in a customer's shopping can be determined earlier and can permit for non-duplicative product suggestions to be determined earlier during the checkout process (e.g., determined before all of the products have been scanned. Additionally, by using product sensing devices, more comprehensive and accurate product suggestions can be presented earlier in the checkout process, which can be helpful to the customer by providing the customer with more time to make decisions and permitting for more efficient fulfillment. For example, if the customer makes a decision to add a product to the transaction earlier in the checkout process, then fulfillment can start earlier and run concurrent while the checkout process is being completed, and can permit for a customer to have a shorter wait (if any wait at all) for in-store fulfillment of the product.

Additionally and/or alternatively, the customer-facing device can be used by customers to search for products that can then be added to the transaction during the checkout process. Search parameters can be received by the customer-facing device and provided to a backend search system, which can provide search results to the customer-facing device for display to a customer. Products can be added to the transaction from the customer-facing device by the customer. For example, the customer may add products that were out of stock, could not be found, were forgotten, or the customer wanted fulfilled by different means.

The customer-facing device may indicate if the product is available in the store, or if the product is out of stock but available at nearby stores, or available online. The customer-facing device can provide various fulfillment options for the customer. For example, the fulfillment options can include in-store fulfillment, in-store pick up at a different store, delivery, or other means of fulfillment. The in-store fulfillment can allow a customer to leave the store with the physical product that was added to the transaction using the customer-facing device. The in-store pick up can allow a customer to pick up the physical product at a different store, such as when the product is out of stock at the present store. The delivery fulfillment can allow a product to be delivered to an address indicated by the customer on the customer-facing device.

Regardless of the method of fulfillment, the product can be added to the current transaction. Accordingly, the physical products being scanned in the checkout aisle, and the products added at the customer-facing device can be purchased in a single transaction, using a single payment method.

The customer-facing device may also provide additional features for the customer, such as loyalty information and/or ads, flyer, coupons, or promotional information. The loyalty information may allow a customer to view their loyalty information, such as their rewards, their status, their account information, etc. The loyalty information may also allow a customer to sign up for the loyalty program using the customer-facing device. The customer may also view the ads, flyer, coupons, or promotional information on the customer-facing device, and add various coupons to their transaction. For example, virtual coupons can be "clipped" to receive discounts for the transaction.

The document also generally relates to systems and methods for providing product-sensing devices in a checkout aisle that are configured to identify product information for products that have not yet been scanned to be added to a transaction. The product-sensing devices can be cameras, RFID sensors, barcode scanners, or other means for identifying the products. The product-sensing devices can be positioned above the checkout aisle. For example, the product-sensing devices can be positioned above a conveyer belt of the checkout lane to collect product information from the conveyer belt. There may be a single product sensor above the checkout lane, or multiple product-sensing devices. The product-sensing devices may point directly down toward the conveyer belt, or point at the conveyer belt at an angle. For example, the product-sensing devices may receive a top view, front view, perspective view, back view, an other view, and/or combinations of multiple views of the products on the conveyer belt. The checkout aisle may include product-sensing devices on a neighboring checkout lane. For example, the product-sensing devices on a neighboring checkout lane may collect product information from a cart of the customer, such as the lower rack. The product-sensing devices may also collect product information for products on the conveyer belt, such as collecting a side view.

In one implementation, a checkout lane includes a point-of-sale terminal configured to complete a transaction, a payment terminal configured to receive payment information and securely transmit payment information, and a customer-facing device configured to add a product to the transaction.

Such a checkout lane can optionally include one or more of the following features. The customer-facing device is positioned near the payment terminal. The customer-facing device can be adjustable between a first position and a second position. The first position can be a landscape orientation and the second position can be a portrait orientation. The first position the customer-facing device can be at a first angle and the in second position the customer-facing device can be at a second angle. The customer-facing device can be configured to receive search parameters for. The customer-facing device can be configured to provide search results based on the search parameters. The customer-facing device can be configured to receive a product selection. The customer-facing device can be configured to provide fulfillment options. The fulfillment options include in-store fulfillment and delivery. The checkout lane can further include a product sensor configured to collect product information signals. The checkout lane can further include a conveyer belt adjacent the point-of-sale terminal. The product sensor can be positioned above the conveyer belt. The product sensor can be positioned to the side of the conveyer belt.

In another implementation, a method for adding a product to a transaction includes receiving a selected product by a customer-facing device, providing fulfillment options by the customer-facing device, and receiving a fulfillment selection from the fulfillment options by the customer-facing device.

Such a method can optionally include one or more of the following features. The method can further include transmitting the selected product from the customer-facing device to a point-of-sale terminal. The method can further include completing a transaction including the selected product and products scanned at the point-of-sale terminal. The fulfillment options can include in-store fulfillment, fulfillment at a different location, and delivery. The method can further include requesting shipping information at the customer-facing device. The method can further include receiving product search parameters at the customer-facing device, access a product database; and providing the product search results on the customer-facing device.

Various embodiments of the subject matter described in this document can be provide one or more of the following advantages. For example, product-sensing devices can collect product information for a transaction before items are scanned, such as shopping carts that include product-sensing devices capable of sensing products placed in the carts and thereby eliminating the need for subsequent scanning. The product information can be used to determine the products on the conveyer belt or in the physical cart before items are scanned. Such information can be used to provide recommendations, promotional information, or other product information to the customer on the customer-facing device. In some embodiments, the product-sensing devices can also help identify when a customer has left products on an lower portion of the cart.

In another example, the customer-facing device can permit a customer to sign up for a loyalty program, modify user information relating to a loyalty program, or provide loyalty program credentials (e.g., phone number, loyalty number, loyalty card number, account number, etc.) during a transaction. This can allow users to complete actions while products are being scanned, without assistance from an employee. Therefore, the customer-facing device can decrease the amount of time a customer spends checking out at a store. Allowing customers to input their own information into the customer-facing device can also increase the likelihood of a customer joining a loyalty program because they do not need to present their information aloud, which can make some people uncomfortable in a public environment. In addition, information can be more accurate when received directly from the customer on the customer-facing device because miscommunication between the customer and the employee regarding personal information can be avoided.

In another example, the customer-facing device can permit a customer to search for a product. The customer may want to search for a product that the customer may have forgotten an item and remembered upon entering the checkout aisle. The customer may want to search for a product the customer wanted to buy, but could not find the product. Alternatively, the customer may want to see if a product is available in a different color or style. As another example, the customer may have found a product in store that they cannot take home, such as large or heavy items that the customer would rather have shipped to their house. Such items can all be searched for using the customer-facing device. The customer-facing device can then provide search results for the search, and the customer can view the results. If the product is found, the product can be added to the current transaction. The customer-facing device can provide multiple fulfillment options based on the customer needs. The product can be picked up in the current store, in a nearby store, or delivered to the customer. This will save time and hassle for the customer, as they can purchase the products in a single transaction, and reduce the likelihood that they will forget the product upon returning home.

The details of one or more embodiments are set forth in the accompanying drawings and the description below. Other features, objects, and advantages will be apparent from the description, drawings, and from the claims.

DESCRIPTION OF DRAWINGS

Like reference numbers represent corresponding parts throughout.

DETAILED DESCRIPTION

The technology disclosed throughout this document includes, for example, one or more product-sensing devices can be positioned in and around a checkout aisle for gathering product signals. The product signals can be used to determine which products are in a customer cart prior to the products being scanned, and which can be used to provide product suggestions on customer-facing devices during a checkout process.

The technology disclosed throughout this document also includes, for example, a customer-facing device that can permit a customer to add products to a cart. The cart can include physical scanned products and virtual products added from the customer-facing device. The products can be added for in-store fulfillment, in-store pick up, or delivery. Products can be items that the customer forgot, could not find in the store, or decided to add after entering the checkout lane. The customer-facing device can communicate with a POS terminal and/or a payment terminal to complete the transaction with a single purchase. Accordingly, both the physical products and the virtual products can be paid for with a single transaction.

The customer-facing device can also permit a customer to register for a loyalty program, modify user information of the loyalty program, and view loyalty program information. The customer-facing device can also permit a customer to view a current ad, flyer, circular, or other promotion information for the store.

Figure 1A:
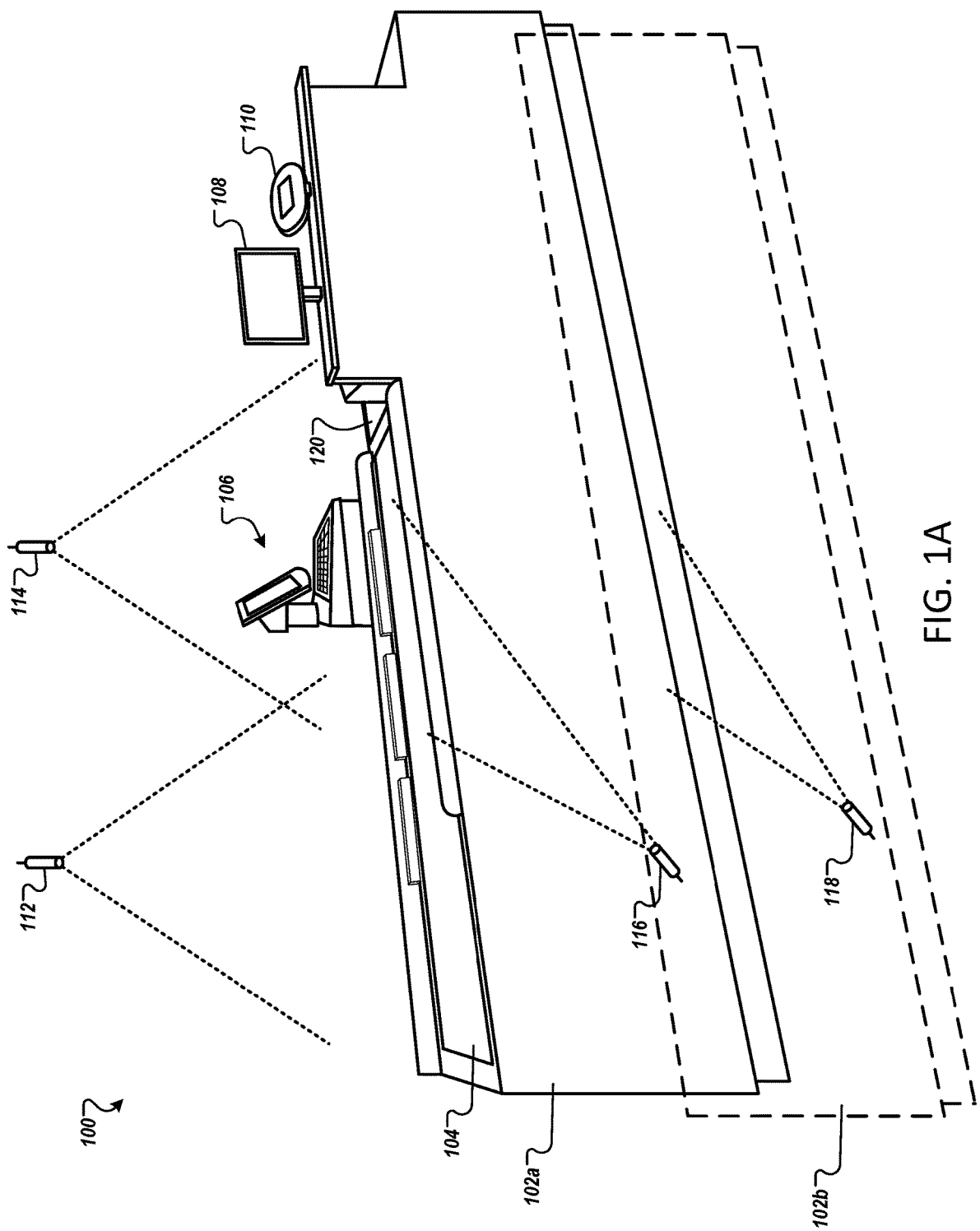
FIG. 1A is perspective view of a checkout aisle with example product-sensing devices and an example customer-facing device.
Figure 1B:
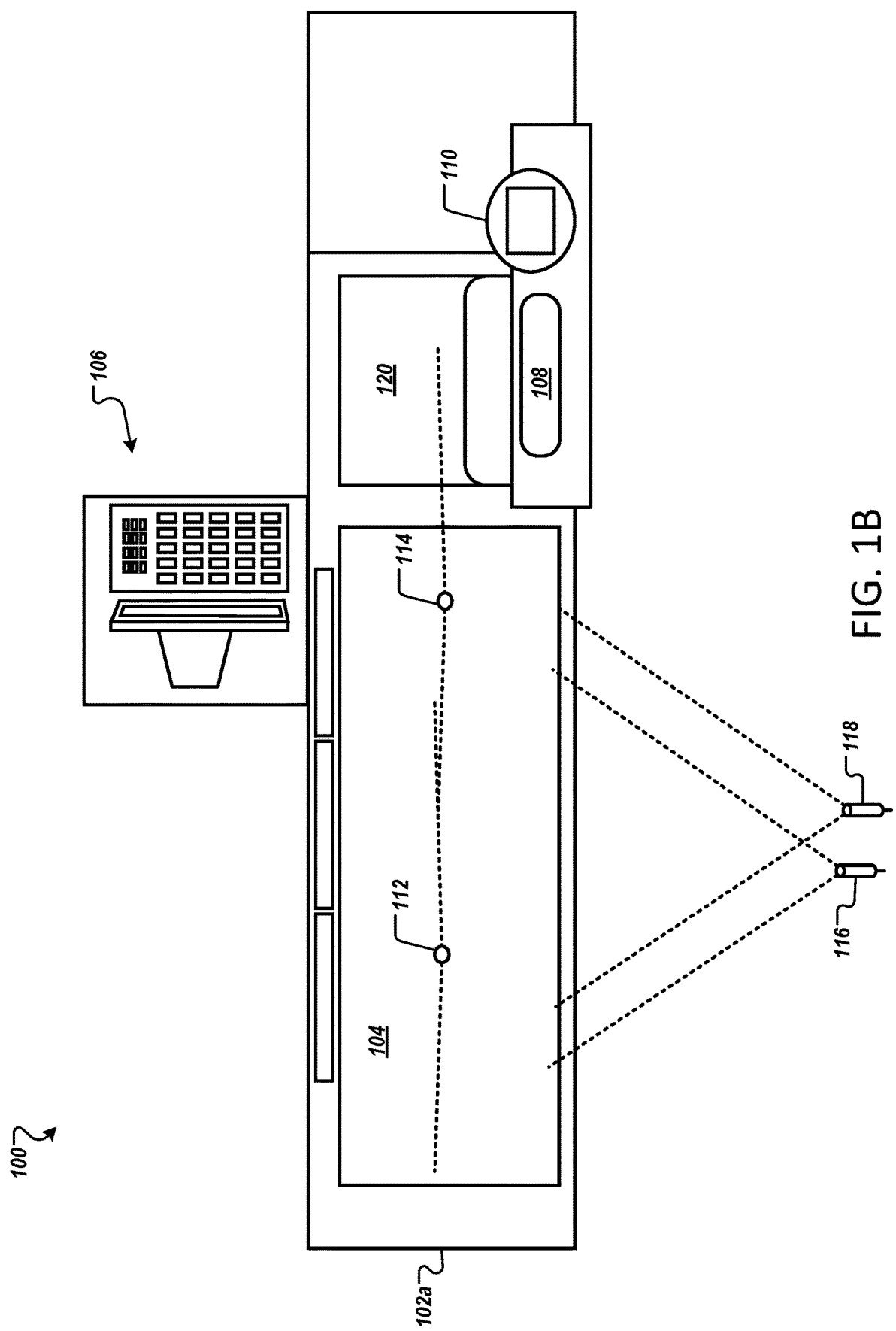
FIG. 1B is a top view of the checkout aisle with the example product-sensing devices and the example customer-facing device of FIG. 1A.
Figure 1C:
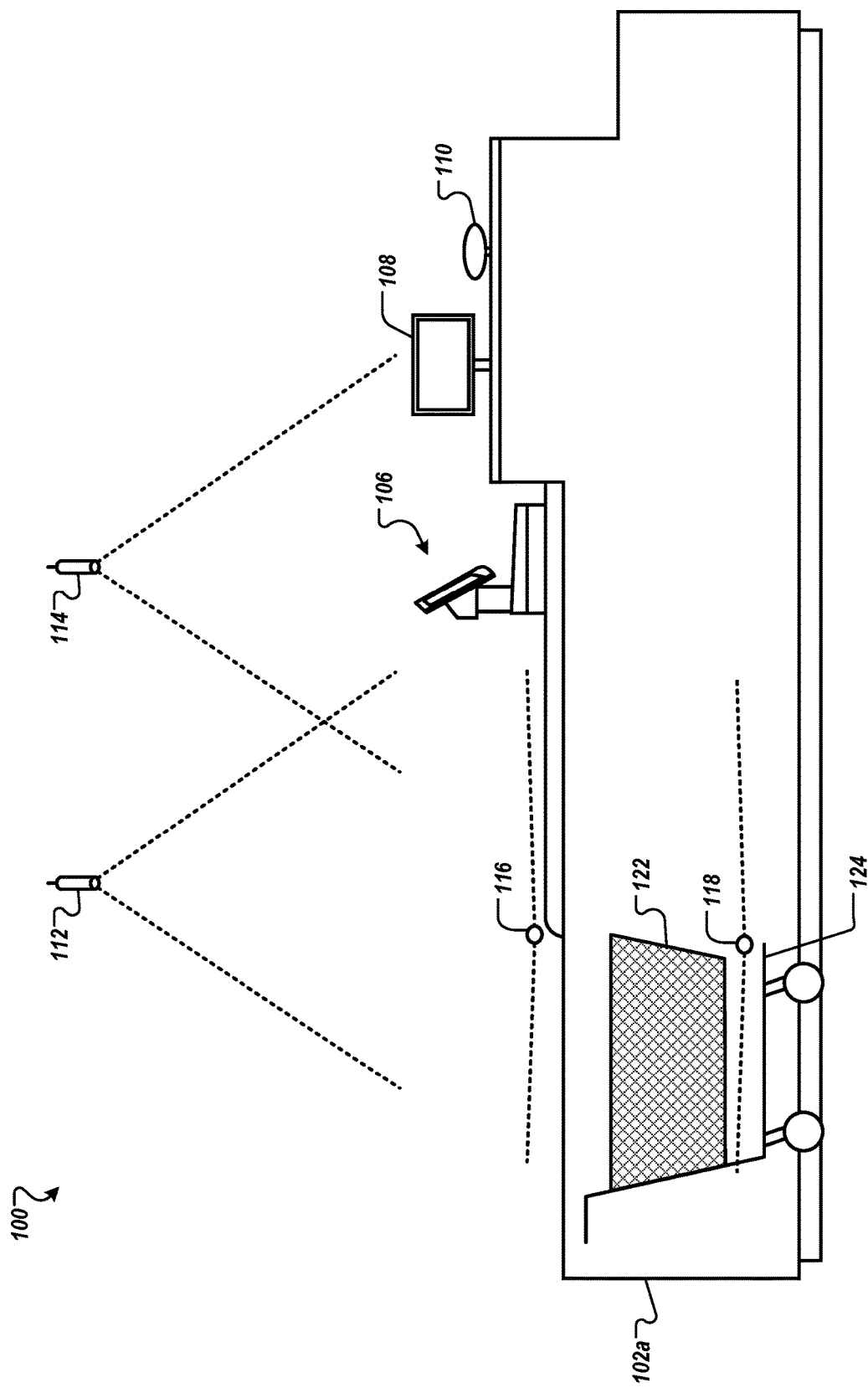
FIG. 1C is a side view of the checkout aisle with the example product-sensing devices and the example customer-facing device of FIGS. 1A and 1B.

FIGS. 1A-1C are various views of a checkout aisle 100 with example product-sensing devices 112-118 and an example customer-facing device 108. Checkout aisle 100 can include a first checkout lane 102*a* and a second checkout lane 102*b*, creating a walkway between the first checkout lane 102*a* and the second checkout lane 102*b*.

The checkout lane 102*a* can include a conveyer belt 104, a cash register 106, the customer-facing device 108, a payment terminal 110, upper product-sensing devices 112 and 114, and a scanner 120. The cash register 106, payment terminal 110, scanner 120, and/or customer-facing device 108 can collectively be a point-of-sale terminal. The second checkout lane 102*b* can include lower product-sensing devices 116 and 118. The first checkout lane 102*a* and second checkout lane 102*b* can be a traditional employee run checkout lane, an express lane, a self-checkout lane, a customer service lane, or other aisle for a consumer to purchase products from a brick and mortar store.

The conveyer belt 104 can aid in moving products from a first end of the checkout lane 102*a* towards the cash register 106 and the scanner 120. For example, the conveyer belt 104 can be continuously moving. As another example, the conveyer belt 104 can move until an item is sensed near the cash register 106 and scanner 120, causing the conveyer belt 104 to stop moving. The conveyer belt 104 can be of varying lengths, depending on the checkout aisle. For example, a longer conveyer belt 104 can be used in a traditional, worker operated, checkout aisle, while a shorter conveyer belt 104 can be used for an express checkout aisle, or a self-checkout aisle. As another example, the conveyer belt 104 can be a simple counter that does not move, but provides a surface for a customer to place products for purchase.

The scanner 120 can be configured to identify products and provide the identified products to cash register 106. An employee, or a customer, can move products across scanner 120 for identification. For example, scanner 120 can be a barcode scanner. As another example, scanner 120 can be a RFID reader. Scanner 120 can be horizontal, vertical, or a combination of the two to aid in capturing the barcode quickly. In some embodiments, scanner 120 can also include a weight scale. In some embodiments, the scanner 120 can also include a scanner interface. For example, when a customer wants to purchase produce, the product identifier code can be entered into the cash register and/or the scanner interface and the produce can be weighed to obtain a purchase price. As another example, the scanner interface can be used to specify a quantity of items, such as a number of produce items that cannot be scanned, or a number of items that can be scanned. For example, time may be saved if several of the same item is being purchased and the item is scanned once and then the quantity is entered.

Cash register 106 can be a computer with a touch screen, keyboard, mouse, display, and/or other means for inputting information. Cash register 106 can be configured to initiate, process, and complete transactions as well as returns and exchanges. For example, cash register 106 can record and track the products scanned by scanner 120. Cash register 106 can be configured to calculate a total purchase price as products are scanned and can calculate tax as needed. Cash register 106 can also be configured to apply sales prices, promotions, and/or coupons. In some embodiments, cash register 106 can be configured to implement customer loyalty programs (e.g., loyalty points, discounts, etc.). In some embodiments, cash register 106 can connect to other systems in a network, such as other cash registers. In some embodiments, cash register 106 can aid in managing inventory. Cash register 106 can also include a cash drawer. In some embodiments, cash register 106 can be coupled to a printer that can print receipts, rebates, and other documents.

The payment terminal 110 can be configured to interface with payment cards (e.g., credit cards, debit cards, and EBT cards) to make electronic funds transfers. For example, the payment terminal 110 can include a magnetic stripe reader, a chip reader, or near field communication device for touch payment. The payment terminal 110 can include a screen, a keypad (or a pinpad), buttons, a stylus. Payment terminal 110 can be communicably coupled to cash register 106 to transmit payment information.

Figure 2A:
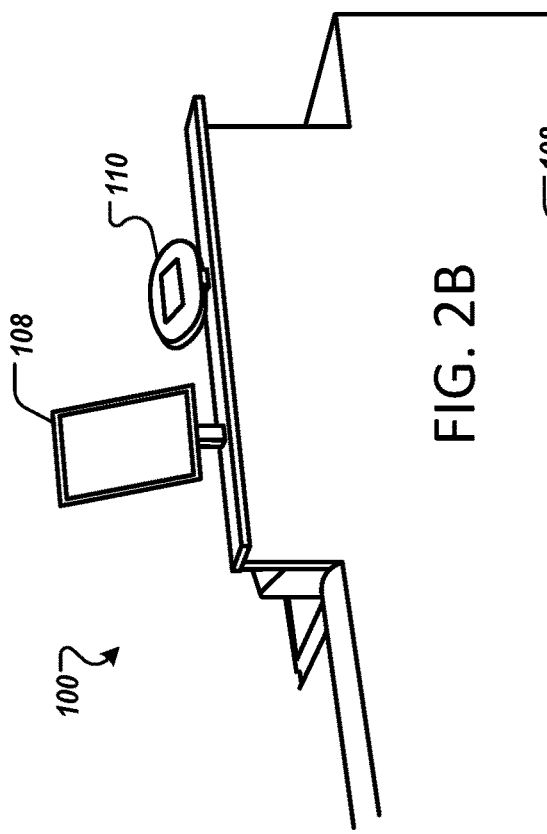
FIGS. 2A-2D are close up perspective views of various embodiments of the example customer-facing device of FIGS. 1A-1C.
Figure 2B:
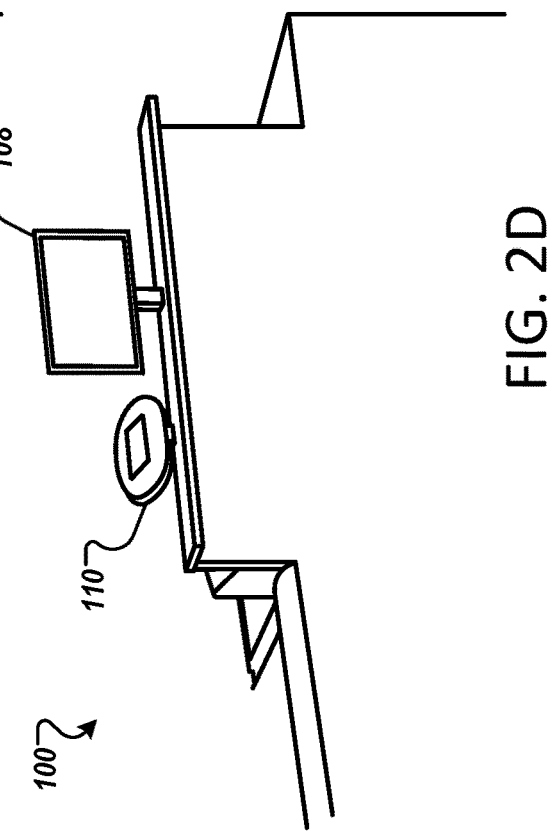
Figure 2C:
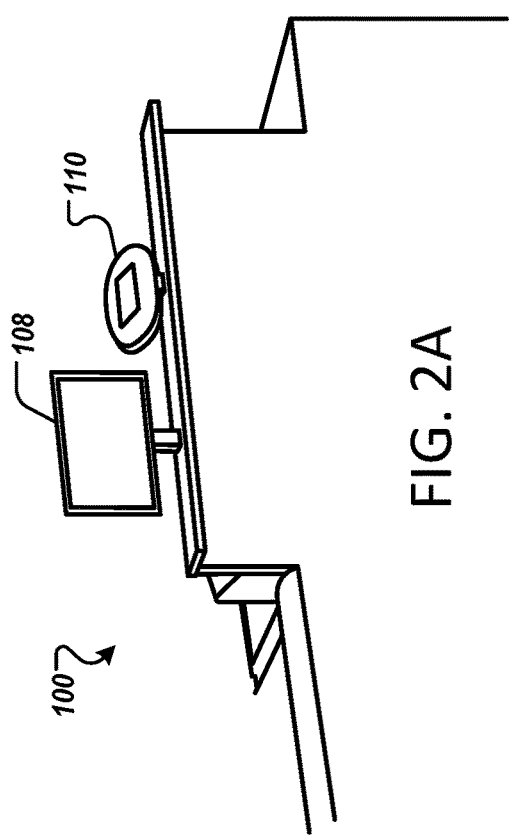
Figure 2D:
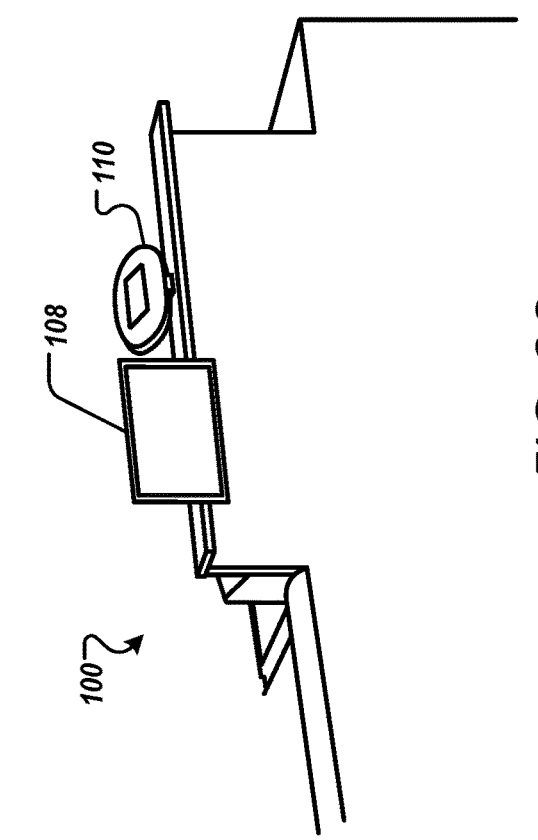

The customer-facing device 108 can be a tablet, interactive display, or other device that the customer can using during the checkout process. In some embodiments, the customer-facing device 108 can be a touch screen. Alternatively, or in addition to the customer-facing device 108 being a touch screen, the customer-facing device 108 can also include a keyboard, mouse pad, number pad, stylus, or other means for inputting information. The customer-facing device 108 can be located near payment terminal 110 to allow a customer to easily use both devices. The customer-facing device 108 can be positioned before or after the payment terminal 110. The customer-facing device 108 can have a landscape orientation (FIG. 2A, 2C, or 2D) or a portrait orientation (FIG. 2B). In some embodiments, the customer-facing device 108 can be adjustable. For example, the customer-facing device 108 can be moved upward or downward for ease of customer use. As another example, the customer-facing device 108 can be adjusted to modify an angle or tilt of the customer-facing device 108.

Figure 3A:
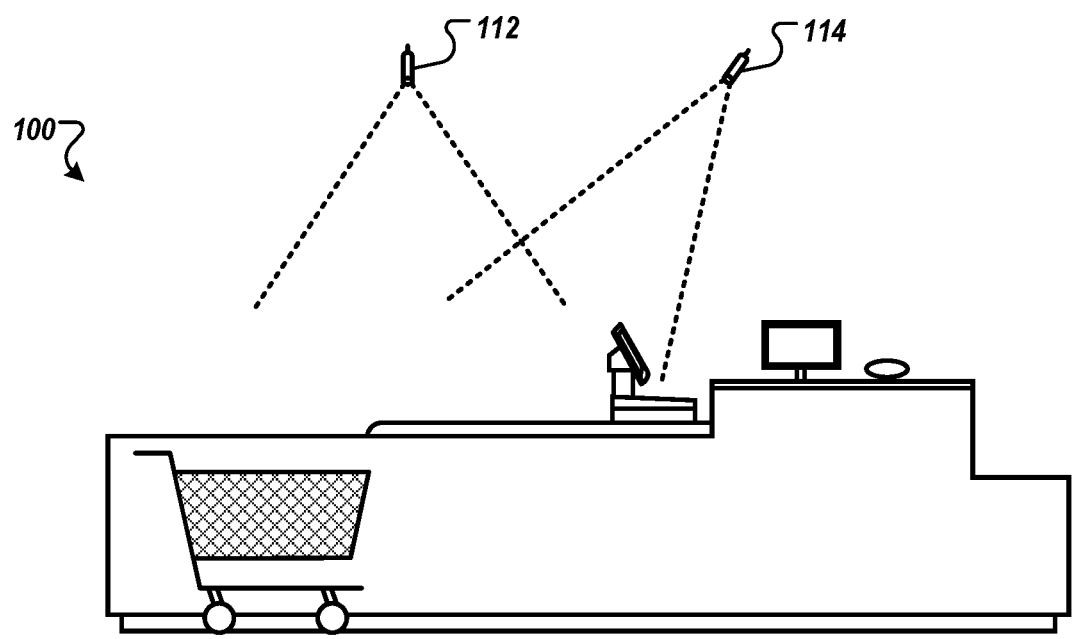
FIGS. 3A and 3B are side views of various embodiments of the product-sensing devices of the checkout aisle of FIGS. 1A-1C.
Figure 3B:
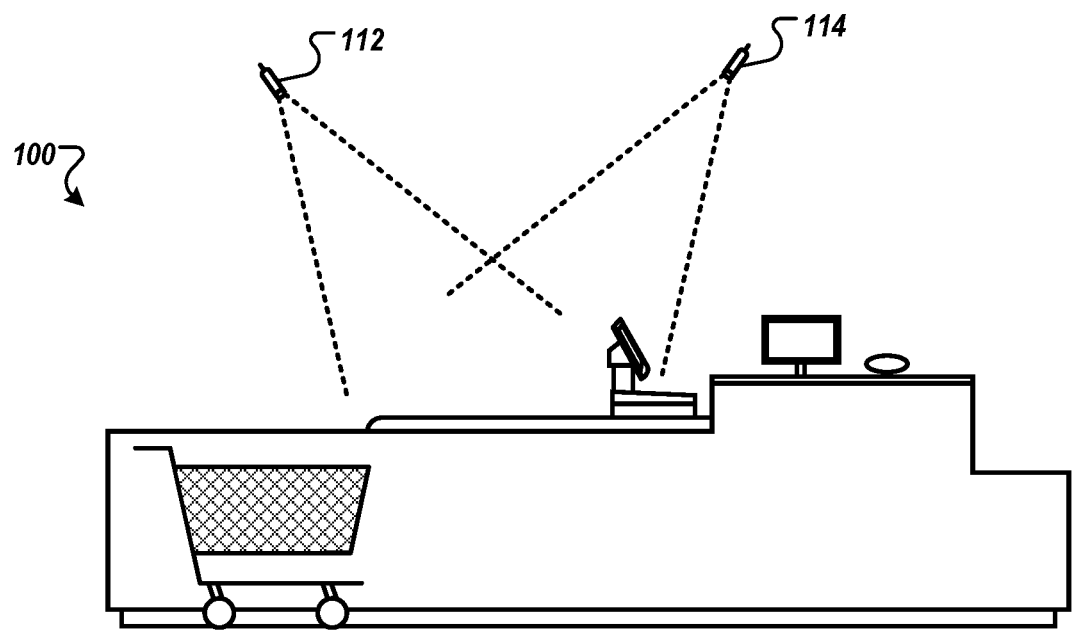
Figure 3C:
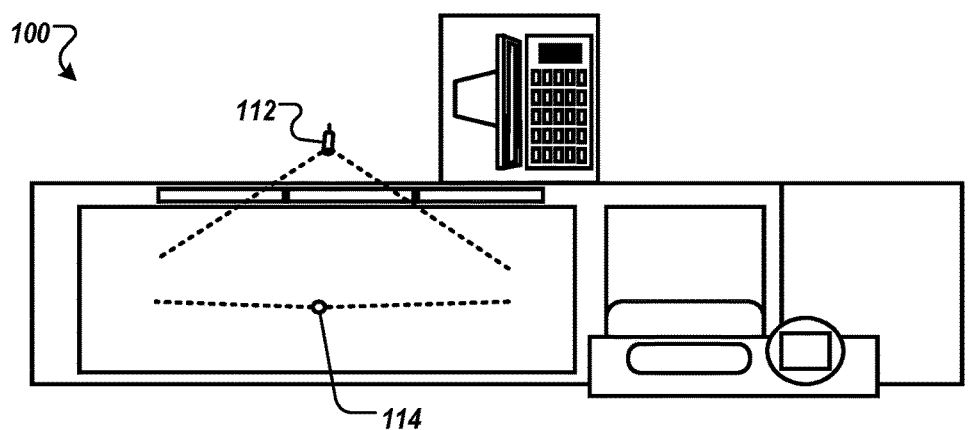
FIG. 3C is a top view of another embodiment of the product-sensing devices of the checkout aisle of FIGS. 1A-1C.

The upper product-sensing devices 112 and 114 can be configured to collect product information from the first checkout aisle 102a. For example, the upper product-sensing devices 112 and 114 can be cameras, scanners, (e.g., a barcode scanner, QR code scanner, RFID scanner), or other means for determining products. The upper product-sensing devices 112 and 114 can be positioned above the checkout aisle 100. For example, the upper product-sensing devices 112 and 114 can be positioned above or substantially above (e.g., linearly offset from) checkout lane 102a. The upper product-sensing devices 112 and 114 can be positioned to collect product information from products on the conveyer belt 104. In some embodiments, the upper product-sensing devices 112 and 114 can be in line with one another. In some cases, upper product-sensing devices 112 and 114 can be pointed directly downward toward conveyer belt 104. In some embodiments, upper product sensor 112 can be pointed directly downward toward conveyer belt 104 and upper product sensor 114 can be pointed at an angle toward conveyer belt 104, such as shown in FIG. 3A. In another embodiment, upper product sensor 114 can be pointed directly downward toward conveyer belt 104 and upper product sensor 112 can be pointed at an angle toward conveyer belt 104. In some cases, upper product-sensing devices 112 and 114 can both be angled toward conveyer belt 104, such as shown in FIG. 3B. In another embodiment, the upper product-sensing devices 112 and 114 can be located along different axes parallel a longitudinal axis of conveyer belt 104, such as shown in FIG. 3C. In some embodiments, the upper product sensor 114 can be positioned above the conveyer belt 104. The upper product sensor 114 can be pointed downward at conveyer belt 104. Alternatively, the upper product sensor 114 can be positioned at an angle toward conveyer belt 104. Upper product sensor 112 can be offset from conveyer belt 104 and be pointed to at an angle toward conveyer belt 104.

Figure 4A:
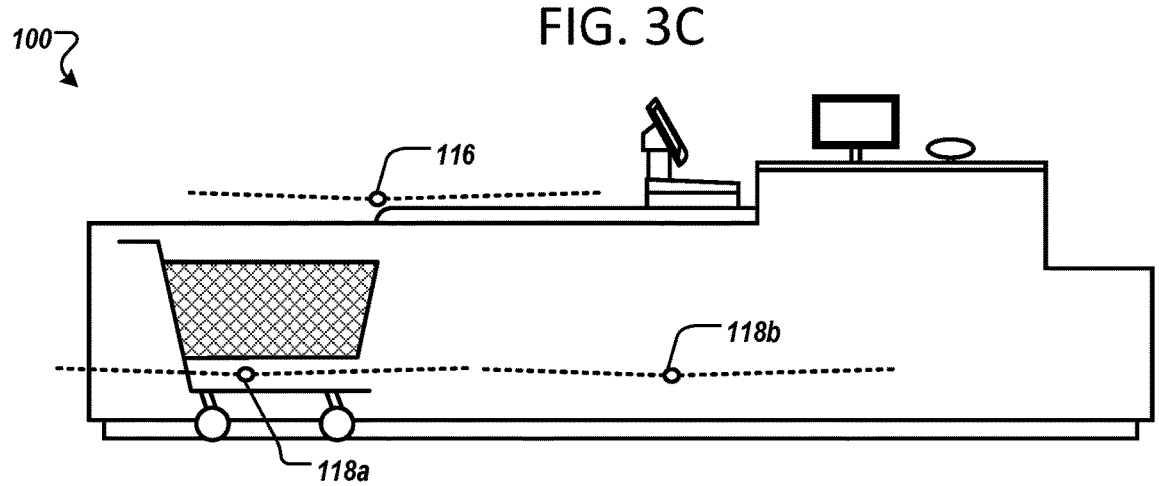
FIGS. 4A and 4B are side views of additional embodiments of the product-sensing devices of the checkout aisle of FIGS. 1A-1C.
Figure 4B:
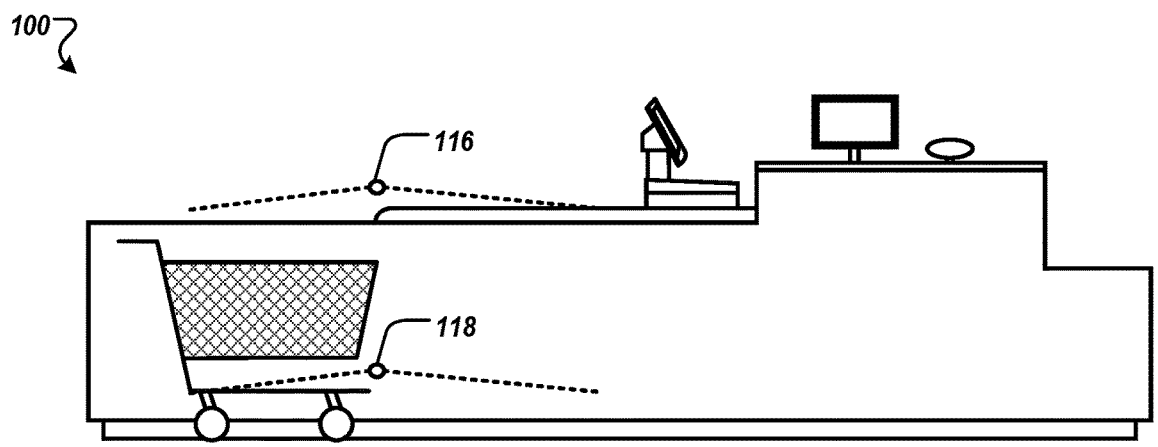

The lower product-sensing devices 116 and 118 can be configured to collect product information from the first checkout lane 102a. For example, the lower product-sensing devices 116 and 118 can be configured to collect product information from a shopping cart 122 located in the first checkout lane 102a. As another example, the lower product-sensing devices 116 and 118 can be positioned to collect product information from a lower rack 124 of the shopping cart 122. As yet another example, the lower product-sensing devices 116 can be configured to collect product information from conveyer belt 104. The lower product-sensing devices 116 and 118 can be cameras, scanners (e.g., a barcode scanner, QR code scanner, RFID scanner), or other means for determining product information. The lower product-sensing devices 116 and 118 can be positioned near the first checkout lane 102a. For example, the lower product-sensing devices 116 and 118 can be coupled to second checkout lane 102b. In some embodiments, the lower product-sensing devices 116 and 118 can be vertically aligned with one another, such as shown in FIG. 1C. In another example, the lower product-sensing devices 116 and 118 can be vertically offset from one another, such as shown in FIG. 1B. The lower product-sensing devices 116 and 118 can be positioned to face checkout aisle 102a horizontally, such as shown in FIG. 1C. In another example, the lower product-sensing devices 116 and 118 can be positioned to angle downwards, such as shown in FIG. 4B. Optionally, only one of the lower product sensor 116 and 118 is angled downwards. In some embodiments, the lower product sensor 118 can include a first lower product sensor 118a and a second lower product sensor 118b. For example, first lower product sensor 118a can be positioned to collect product information from a first portion of the checkout lane 102a, while the second lower product sensor 118b can be positioned to collect product information from a second portion of the checkout lane 102a that is closer to the cash register 106.

Figure 5:
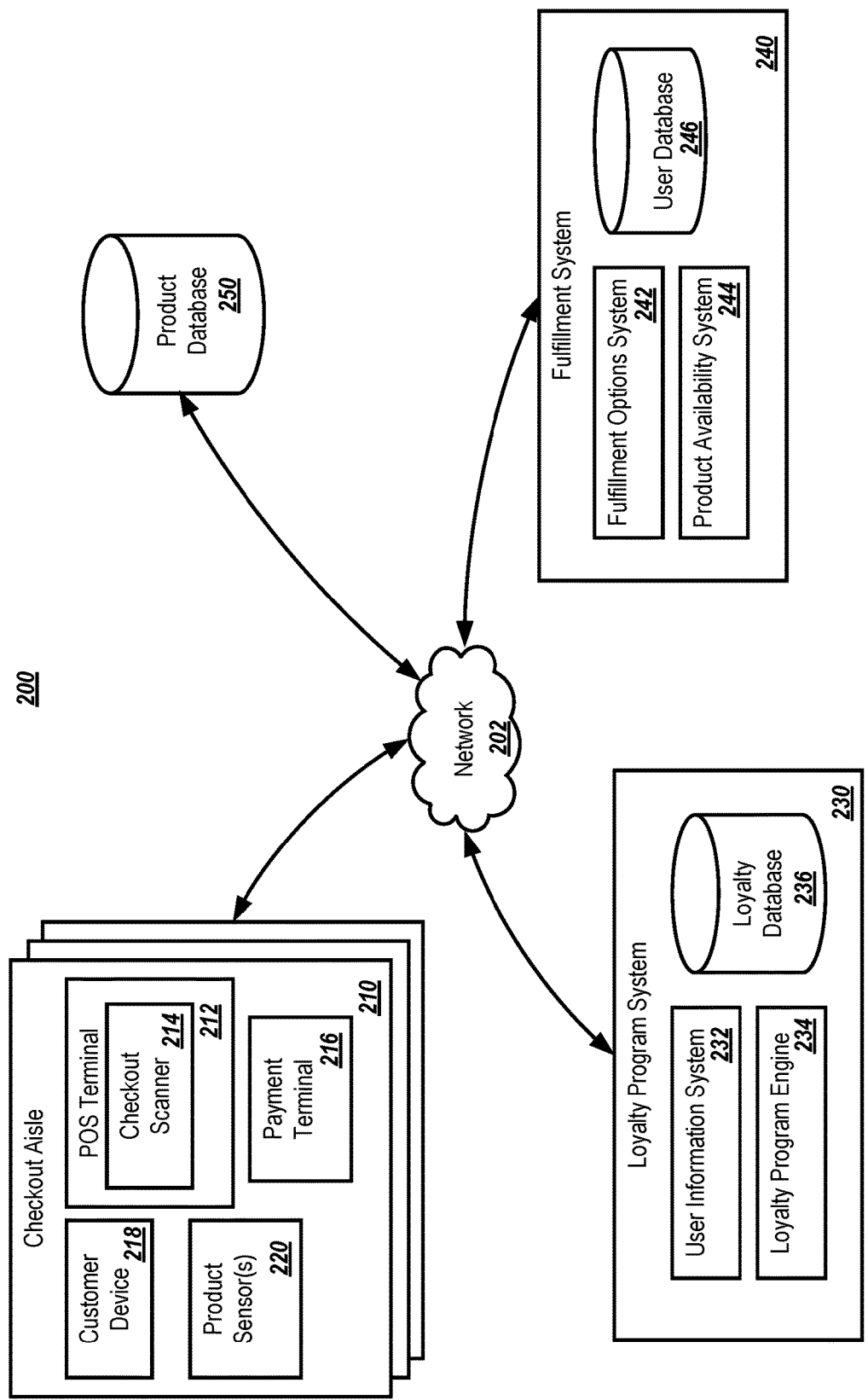
FIG. 5 is a conceptual diagram of an example system for using a customer-facing device.

FIG. 5 is a conceptual diagram of an example system 200 for using a customer-facing device. The system 200 can include a network 202, a checkout aisle 210, a loyalty program system 230, a fulfillment system 240, and a product database 250.

The network 202 can include, for example, a mobile data network (e.g., 4G LTE network), cellular networks, other wireless networks (e.g., open/public Wi-Fi networks within a store), and/or combinations thereof.

The checkout aisle 210 can include a POS terminal 212 with a checkout scanner 214, and a payment terminal 216. POS terminal 212 can be similar to POS terminal 106 described above with regard to FIGS. 1A-1C. Checkout scanner 214 can provide means for adding products to a virtual cart, such as during a checkout process. Checkout scanner 214 can be configured to scan QR codes, barcodes, RFID tags, and/or other means for identifying a product. Payment terminal 216 can be communicably connected to POS terminal 212 to permit a user to pay for the products in cart at the POS terminal. Payment terminal 216 can be configured to receive payment information and securely transmit payment information. Payment terminal 216 can receive payment information via a magnetic strip on a card, a chip embedded in a card, and/or near-field communication with a contactless card that contains a computer chip and an antenna. Payment can receive payment via several payment methods (e.g., debit card, credit card, EBT, Apple Pay, and others).

Checkout aisle 210 can also include a customer-facing device 218. Customer-facing device 218 can be similar to customer-facing device 108 described above with respect to FIGS. 1A-2D. Customer-facing device 218 can be configured to permit a customer to add products to a transaction before, during, or after physical products have been scanned by the checkout scanner 214. This process is described in further detail with regard to FIGS. 6 and 7. For example, the customer-facing device 218 can be used to search for products. Search parameters can be received by the customer-facing device 218 and provide search results to be displayed on the customer-facing device. Products can be added to the transaction by the customer-facing device 218 when selected by the customer. For example, the customer may add products that were out of stock, could not be found, were forgotten, or the customer wanted fulfilled by different means.

The customer-facing device 218 may indicate if the product is available in the store, or if the product is out of stock but available at nearby stores, or available online. The customer-facing device 218 can provide various fulfillment options for the customer. For example, the customer-facing device 218 can communicate with the fulfillment system 240.

Regardless of the method of fulfillment, the product can be added to the current transaction. Therefore, the physical products being scanned in the checkout aisle, and the products added at the customer-facing device can be purchased in a single transaction, using one or more payment methods. Accordingly, the customer-facing device 218 can be communicably coupled to the POS terminal 212 and the payment terminal 216.

The customer-facing device 216 may also provide additional features for the customer, such as loyalty information and/or ads, flyer, coupons, or promotional information. The loyalty information may allow a customer to view their loyalty information, such as their rewards, their status, their account information, etc. The loyalty information may also allow a customer to sign up for the loyalty program using the customer-facing device 218. Accordingly, the customer-facing device 218 may be communicably coupled to the loyalty program system 230.

The customer-facing device 218 may display the ads, flyer, coupons, or promotional information, and various coupons can be added to the transaction using the customer-facing device. For example, virtual coupons can be "clipped" to receive discounts for the transaction using the customer-facing device 218.

Checkout aisle 210 can also include one or more product-sensing devices 220. The product-sensing devices can be configured to collect product information from the checkout aisle 210. For example, the product-sensing devices 220 can be cameras, scanners, (e.g., a barcode scanner, QR code scanner, RFID scanner), or other means for determining products, or collecting product signals. The product-sensing devices 220 can communicate with the product database to determine products based on the product signals.

The loyalty program system 230 can include a user information system 232, a loyalty program engine 234, and a loyalty database 236. User information system 232 can maintain user information for customers that have signed up for the loyalty program. For example, the user information system 232 can include customer name, address, and phone number. In another example, the user information system 232 can also include payment methods, billing information, gift cards, and other user information relating to payments for the customer. In some embodiments, the user information system 232 can include loyalty information. For example, the user information system 232 can include loyalty benefits, loyalty points, and/or loyalty level (e.g., standard, silver, gold, etc.).

Loyalty program engine 234 can generate loyalty program perks. For example, loyalty program engine 234 can determine which products are on sale, have a promotion, or can gain a customer loyalty points. Loyalty program engine 234 can communicate with the customer-facing device 218, the POS terminal 212 and/or the payment terminal 216 to provide loyalty information.

Loyalty database 236 can maintain loyalty information. For example, loyalty database 236 can maintain various loyalty programs, loyalty program parameters, loyalty program criteria, or other loyalty information that can be universal across different customers.

The fulfillment system 240 can include a fulfillment options system 242, a product availability system 244, and user database 246. When products are added to the virtual shopping cart without scanning the product (e.g., via the customer-facing device 218), the user can be prompted to select a fulfillment method for the product.

The fulfillment options system 242 can facilitate fulfillment of products through traditional online store fulfillment methods associated with the store. For example, the customer can provide an address for delivery and the products can be delivered through the mail (e.g., USPS, FedEx, UPS, etc.).

As another example, the fulfillment options system 242 can provide in-store fulfillment of products such that the customer can walk out of the store with the physical products. For example, in-store fulfillment can provide a location of the selected product to the customer, and the customer can obtain the product in-store. As another example, in-store fulfillment can notify employees of the selected product, a location to deliver the product (e.g., cosmetics counter, electronics department, POS terminal, etc.) and the location can be provided to the device of the customer so the customer can retrieve the product from the designated location. As another example, the in-store fulfillment can notify an employee to deliver the selected product to the customer, for example, at the kiosk or POS terminal that the customer is interacting with when selecting the product.

The fulfillment options system 242 can provide fulfillment of the selected product using third party delivery services. For example, fulfillment can be provided using delivery services such as InstaCart, Amazon Prime Now, and other in-home and/or immediate delivery service providers. The customer can provide an address for delivery, and optionally, select the provider. In another example, the delivery service provider is determined based on the selected product.

The product availability system 244 can maintain and provide information relating to availability of products. For example, the product availability system 244 can determine backroom stock levels. As another example, the product availability system 244 can estimate store floor stock levels. In some embodiments, the product availability system 244 can include information from the current store. In another embodiment, the product availability system 244 can include information for multiple stores (e.g., stores nearby, stores in the same region, stores in the same state, all stores). Alternatively, the product availability system 244 can communicate with product availability systems of other stores to obtain product availability.

The user database 246 can maintain the required information to complete a fulfillment for a customer. For example, the user database 246 can include first name, last name, house number, street name, city, state, zip code, and/or other information required for shipping a product. In some embodiments, the user database 246 can include saved user information from customer accounts, loyalty programs, or other added user information.

The product database 250 can maintain product information. For example the product database 250 can include all products available throughout the store. In some embodiments, the product database 250 can include all products available throughout any store of the company. The product database 250 can maintain product name, product type, product identifier, color, description, cost, and other information pertaining to the products. In some embodiments, the product database 250 can be used to identify products from the product-sensing devices 220. In addition, the product database 250 can be used to compile products based on various search parameters.

Figure 6:
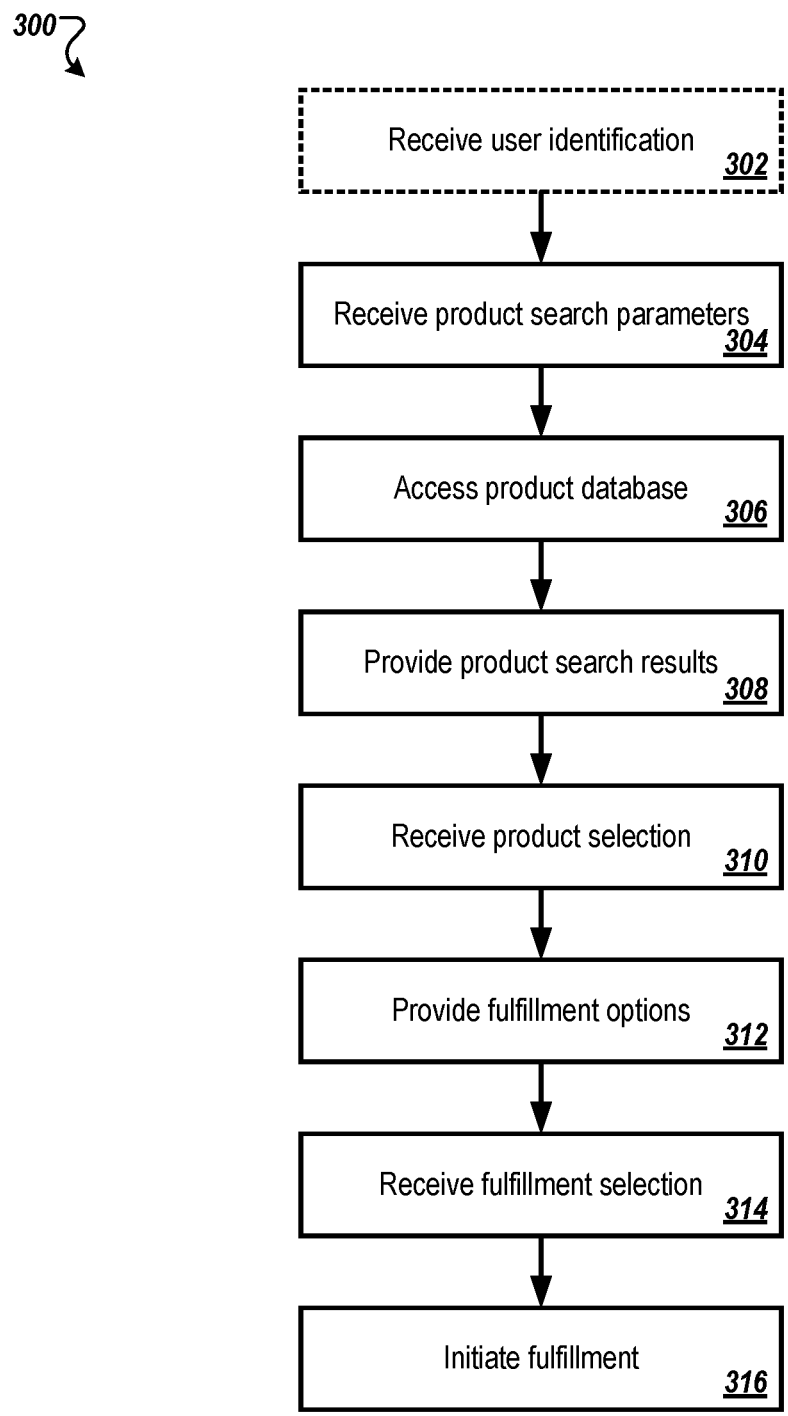
FIG. 6 is a flowchart of an example process for operation of the customer-facing device.

FIG. 6 is a flowchart of an example process 300 for operation of the customer-facing device 218.

Optionally, the customer-facing device 218 can receive user identification (302). For example, the user identification can be received by a customer entering information on the customer-facing device relating to a customer loyalty program. More specifically, the customer could enter their phone number, a name (e.g., last name, first and last name, etc.), an account number, a card number, or other unique identification number into the customer-facing device 218. As another example, the customer-facing device 218 can receive user identification from the checkout scanner 214. More specifically, a loyalty card of the customer can be scanned with the checkout scanner 214 and the information can be received by customer-facing device 218. As another example, the customer-facing device 218 can receive user identification from the payment terminal 216. More specifically, the customer can enter their phone number, an account number, a card number, or other unique identification number into the payment terminal 216, which can then transmit the user identification to the customer-facing device 218. Alternatively, the customer can provide a method of payment (e.g., credit card, debit card, gift card, store card, Apple pay, Samsung pay, etc.) that is inserted, swiped, or put in proximity to the payment terminal 216, which can in turn provide user identification to the customer-facing device 218. In some embodiments, the customer can provide the payment information before, during, or after the products have been scanned.

The customer-facing device 218 can receive product search parameters (304). The customer can enter search parameters for a product into the customer-facing device 218. For example, the customer-facing device 218 can receive search parameters for a specific product, a general product type, a product identification number, a category, etc. In some embodiments, the customer-facing device 218 can also provide filtering parameters, such as color, size, price, brand, relevance, etc. Optionally, the customer-facing device 218 can additionally provide filtering options based on availability (e.g., in store, in a nearby store online, etc.).

The customer-facing device 218 can access the product database 250 (306). The search parameters can be used to identify products in the product database 250 fitting the search parameters. In some embodiments, products similar to the search parameters can also be identified. In some embodiments, the products identified are only those available at the current store location. In another embodiment, the products identified are those available at nearby stores. For example, the customer-facing device 218 could receive distance parameters. In some embodiments, the products identified are those available online.

The customer-facing device 218 can provide product search results (308) and receive a product selection (310). The customer-facing device 218 can provide the product search results to the customer by displaying the results on customer-facing device 218. In some embodiments, the product search results can be modifiable based on additional criteria received by the customer-facing device 218. In some embodiments, the customer-facing device 218 can provide the product search results as a list, images of various size, or other viewing options. The provided product search results can provide partial product information, with more complete product information available when an item is clicked on, hovered over with a mouse or finger, or other means for identifying that additional information is being requested for a product. Product selection can be received by a customer indicating that they would like to purchase one or more products.

The customer-facing device 218 can provide fulfillment options (312), receive a fulfillment selection (314), and initiate fulfillment (316). In some cases, the customer-facing device 218 provide multiple options for methods of receiving the selected products. For example, the customer-facing device 218 can provide in-store fulfillment, in-store pick up at a different store, and delivery options. In some embodiments, in-store fulfillment can include notifying an employee to retrieve and deliver the product to the customer. In some embodiments, delivery options can include delivery to a store (e.g., the current store or a different store). In some embodiments, delivery fulfillment can include delivering the selected product or products to an address selected by the customer, The customer-facing device 218 can communicate with the payment terminal 216 and payment can include the products selected via the customer-facing device 218. Accordingly, a single transaction can be completed that include the physical products that were scanned, as well as any products added using the customer-facing device 218.

Figure 7:
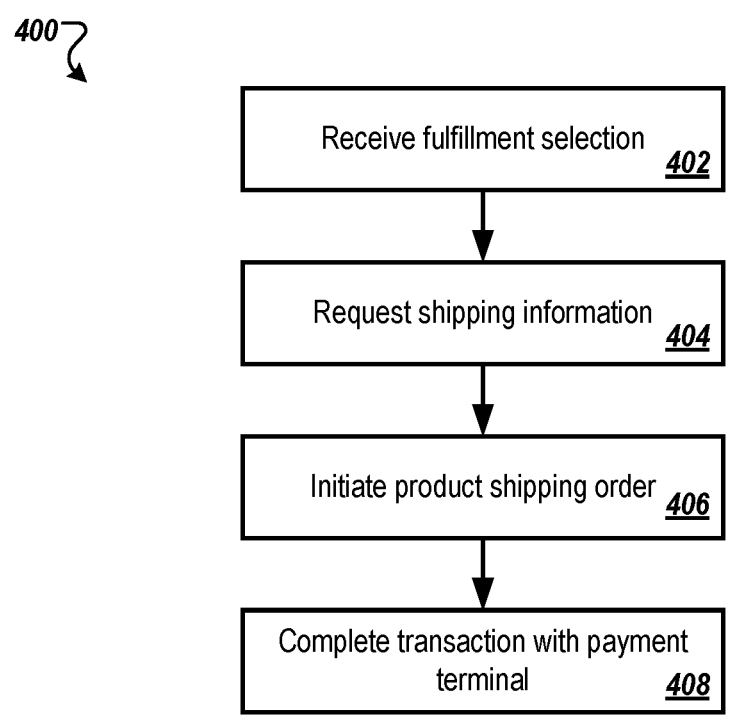
FIG. 7 is a flowchart of an example process for fulfilling a customer order from the customer-facing device.

FIG. 7 is a flowchart of an example process 400 for fulfilling a customer order from the user display device with the fulfillment system 240.

The customer-facing device 218 can receive fulfillment selection (402). For example, the customer-facing device 218 can receive a selection of in-store fulfillment, in-store pick up at a different store, and delivery options, as described with respect to FIG. 6.

When delivery is selected, the customer-facing device 218 can request shipping information (404). In some embodiments, such as when user information is received by customer-facing device 218, the request for shipping information can include addresses associated with the user information. For example, a user profile may include one or more saved addresses. The customer-facing device 218 can receive shipping information from an address selected from the addresses associated with the user information. In another embodiment, the customer-facing device 218 can request an name, a house number, a street address, a city, a state, a zip code, and/or a country is requested. In some embodiments, the shipping information request can also include a request for a shipping method. For example, the shipping information request can include a selection for USPS, FedEx, UPS, or other shipping options. In some embodiments, the request for shipping information can include a request for shipping time frame. For example, the shipping time frame can be ground, express, 3 day, 2 day, overnight, etc.

The customer-facing device 218 can receive the shipping information and initiate product shipping order (406). In some cases, the customer-facing device 218 can the initiate product shipping order via the online order system. In some embodiments, the customer-facing device 218 can initiate the product shipping order via a separate system.

The transaction can be completed with the payment terminal 216 (408). The customer-facing device 218 can communicate with the payment terminal 216 to provide the cost of the additional products. In some embodiments, the customer-facing device 218 can communicate with the POS terminal 212 and the POS terminal 212 can compile the total cost of the transaction and transmit the transaction information to the payment terminal 216. Therefore, the scanned products and the products selected on the customer-facing device 218 can be paid for in a single transaction with a single payment method.

Figure 8:
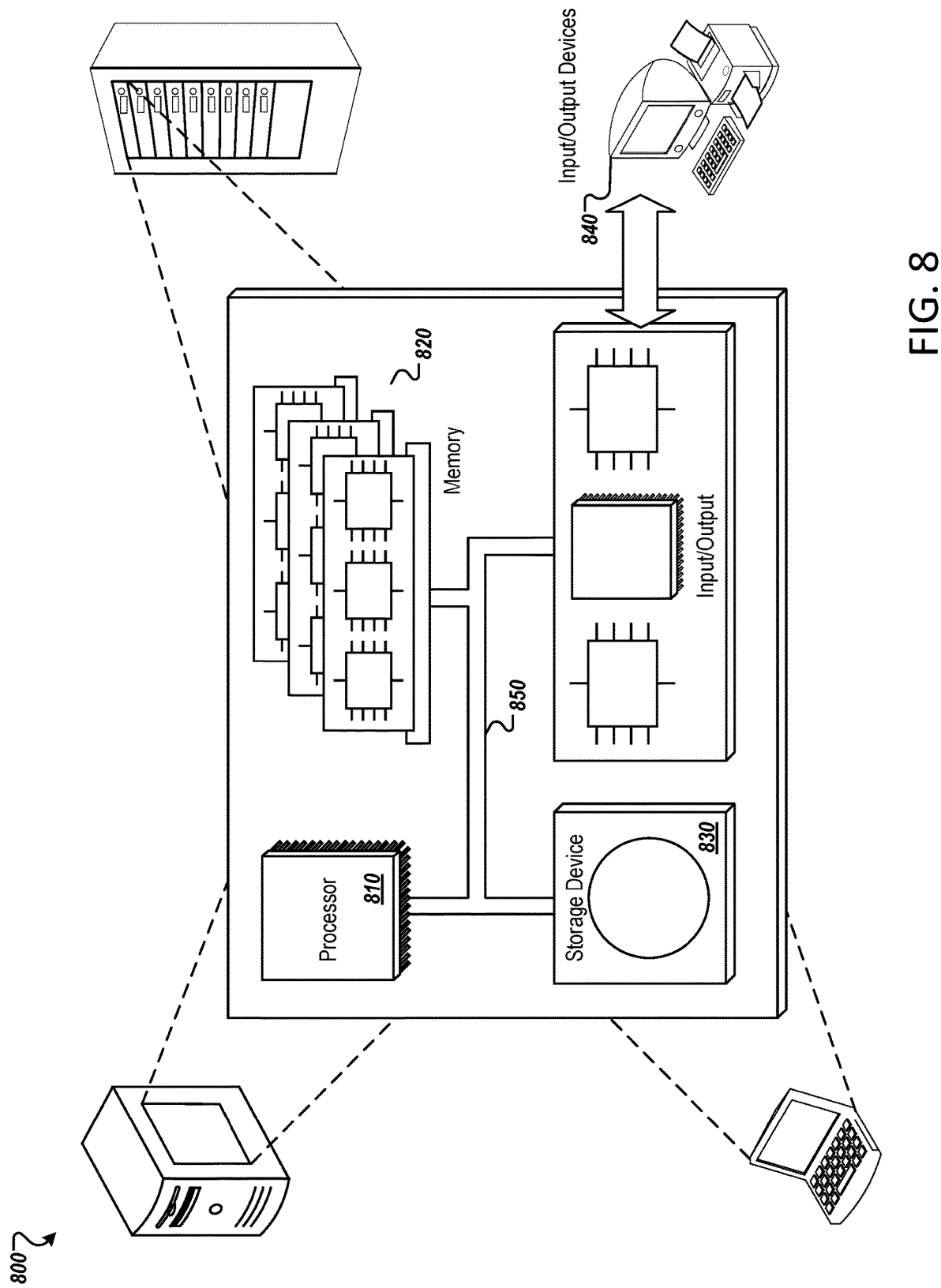
FIG. 8 is a schematic diagram that shows an example of a computing system.

FIG. 8 is a schematic diagram that shows an example of a computing system 800. The computing system 800 can be used for some or all of the operations described previously, according to some implementations. The computing system 800 includes a processor 810, a memory 820, a storage device 830, and an input/output device 840. Each of the processor 810, the memory 820, the storage device 830, and the input/output device 840 are interconnected using a system bus 850. The processor 810 is capable of processing instructions for execution within the computing system 800. In some implementations, the processor 810 is a single-threaded processor. In some implementations, the processor 810 is a multi-threaded processor. The processor 810 is capable of processing instructions stored in the memory 820 or on the storage device 830 to display graphical information for a user interface on the input/output device 840.

The memory 820 stores information within the computing system 800. In some implementations, the memory 820 is a computer-readable medium. In some implementations, the memory 820 is a volatile memory unit. In some implementations, the memory 820 is a non-volatile memory unit.

The storage device 830 is capable of providing mass storage for the computing system 800. In some implementations, the storage device 830 is a computer-readable medium. In various different implementations, the storage device 830 may be a floppy disk device, a hard disk device, an optical disk device, or a tape device.

The input/output device 840 provides input/output operations for the computing system 800. In some implementations, the input/output device 840 includes a keyboard and/or pointing device. In some implementations, the input/output device 840 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A checkout lane system, comprising:
   a point-of-sale terminal configured to complete a transaction, wherein the point-of-sale terminal includes (i) a product scanner embedded in a top surface of the point-of-sale terminal and configured to scan physical products for purchase as part of the transaction and (ii) a display;
   a payment terminal configured to receive payment information and securely transmit payment information;
   a conveyor belt adjacent to the point-of-sale terminal, the conveyor belt providing a movable surface on which physical products are placed in preparation for scanning by the product scanner, wherein the conveyor belt is configured to convey the physical products toward the product scanner at the point-of-sale terminal by moving the movable surface;
   one or more cameras that are (i) positioned adjacent to the conveyor belt and (ii) oriented to capture images of the conveyor belt and the physical products positioned thereon, wherein the one or more cameras are different from the product scanner, wherein the one or more cameras capture images of the physical products before the physical products are scanned by the product scanner at the point-of-sale terminal; and
   a customer-facing device that is separate from the point-of-sale terminal and configured to (i) identify and output, at a display screen of the customer-facing device, product suggestions for additional products to be added to a virtual shopping cart while the physical products are imaged by the one or more cameras as the physical products are conveyed, by the conveyor belt, towards the product scanner for scanning, (ii) receive user input, at the customer-facing device to select one or more of the additional products for addition to the virtual shopping cart and (iii) add the additional products in the virtual shopping cart to the transaction to be purchased at a same time as the physical products that are scanned by the product scanner,
   wherein the additional products are virtual products different from the physical products that are scanned by the product scanner and added to the transaction by the point-of-sale terminal, wherein the product suggestions are determined, by the customer-facing device, based on (i) a first group of the physical products that have already been scanned by the product scanner at the point-of-sale terminal and (ii) a second group of the physical products that have not yet been scanned by the product scanner at the point-of-sale terminal but that are identified from the images provided by the one or more cameras when the second group of the physical products is positioned on the conveyor belt and before the second group of the physical products is scanned by the product scanner, wherein the additional products included in the product suggestions are different from the first group of the physical products and the second group of the physical products, wherein the product suggestions are identified and outputted at the customer-facing device before the second group of the physical products are scanned by the product scanner so as to provide non-duplicative product suggestions to a user at the customer-facing device.

2. The checkout lane of claim 1, wherein the customer-facing device is positioned near the payment terminal.

3. The checkout lane of claim 1, wherein the customer-facing device is adjustable between a first position and a second position.

4. The checkout lane of claim 3, wherein the first position is a landscape orientation and the second position is a portrait orientation.

5. The checkout lane of claim 3, wherein in the first position the customer-facing device is at a first angle and the in second position the customer-facing device is at a second angle.

6. The checkout lane of claim 1, wherein the customer-facing device is configured to (i) receive search parameters for additional products to be added to the virtual shopping cart and (ii) present search results identifying the additional products satisfying the search parameters, the search results being presented on the customer-facing device with selectable features that, when selected, add one or more of the additional products to the virtual shopping cart and to the transaction.

7. The checkout lane of claim 6, wherein the customer-facing device is configured to provide search results based on the search parameters.

8. The checkout lane of claim 6, wherein the customer-facing device is configured to receive a product selection.

9. The checkout lane of claim 1, wherein the customer-facing device is configured to provide fulfillment options.

10. The checkout lane of claim 9, wherein the fulfillment options include in-store fulfillment and delivery.

11. The checkout lane of claim 1, further comprising a product sensor configured to collect product information signals.

12. The checkout lane of claim 11, wherein the product sensor is positioned above the conveyer belt.

13. The checkout lane of claim 11, wherein the product sensor is positioned to the side of the conveyer belt.

14. The checkout lane of claim 1, wherein the customer-facing device is oriented towards a customer side of the conveyor belt and the display of the point-of-sale terminal is oriented towards a worker side of the conveyor belt.

15. A method for adding a product to a transaction, the method comprising:
   receiving, by a customer-facing device, a selected product, wherein the customer-facing device is configured to (i) identify and output, at a display screen of the customer-facing device, product suggestions for additional products to be added to a virtual shopping cart while physical products are imaged by one or more cameras as the physical products are conveyed, by a conveyor belt, towards a product scanner for scanning, (ii) receive user input, at the customer-facing device to select one or more of the additional products for addition to the virtual shopping cart and (iii) add the additional products in the virtual shopping cart to the transaction to be purchased at a same time as the physical products that are scanned by the product scanner, wherein the additional products are virtual products different from the physical products that are scanned by the product scanner and added to the transaction by a point-of-sale terminal, wherein the customer-facing device is part of a checkout lane system that further comprises (i) the point-of-sale terminal configured to complete the transaction, wherein the point-of-sale terminal includes a product scanner embedded in a top surface of the point-of-sale terminal and configured to scan the physical products for purchase as part of the transaction and a display and wherein the point-of-sale terminal is separate from the customer-facing device, (ii) a payment terminal configured to receive payment information and securely transmit payment information, (iii) the conveyor belt adjacent to the point-of-sale terminal, the conveyor belt providing a movable surface on which the physical products are placed in preparation for scanning by the product scanner, wherein the conveyor belt is configured to convey the physical products toward the product scanner at the point-of-sale terminal by moving the moveable surface, and (iv) one or more cameras that are positioned adjacent to the conveyor belt and oriented to capture images of the conveyor belt and the physical products positioned thereon, wherein the one or more cameras are different from the product scanner, wherein the one or more cameras capture images of the physical products before the physical products are scanned by the product scanner at the point-of-sale terminal, wherein the customer-facing device is configured to determine, based on a first group of the physical products that have already been scanned by the product scanner at the point-of-sale terminal and a second group of the physical products that have not yet been scanned by the product scanner at the point-of-sale terminal but that are identified from the images provided by the one or more cameras when the second group of the physical products is positioned on the conveyor belt and before the second group of the physical products is scanned by the product scanner, the product suggestions, wherein the additional products included in the product suggestions are different from the first group of the physical products and the second group of the physical products, wherein the product suggestions are identified and outputted at the customer-facing device before the second group of the physical products are scanned by the product scanner so as to provide non-duplicative suggestions to a user at the customer-facing device;

providing, by the customer-facing device, fulfillment options;

receiving, by the customer-facing device, a fulfillment selection from the fulfillment options;

transmitting, by the customer-facing device to the point-of-sale terminal, the selected product; and completing, by the customer-facing device, a transaction including the selected product and the physical products scanned at the point-of-sale terminal.

16. The method of claim 15, wherein the fulfillment options include in-store fulfillment, fulfillment at a different location, and delivery.

17. The method of claim 16, further comprising:
requesting shipping information at the customer-facing device.

18. The method of claim 15, further comprising:
receiving product search parameters at the customer-facing device;
accessing a product database; and
providing the product search results on the customer-facing device.

* * * * *